United States Patent [19]
Schroeder et al.

[11] Patent Number: 5,601,854
[45] Date of Patent: Feb. 11, 1997

[54] SPINNING HEAD WITH FILTER CARTRIDGE

[75] Inventors: Heinz D. Schroeder, Frankfurt am Main; Guenter Koschinek, Dietzenbach, both of Germany

[73] Assignee: Zimmer Aktiengesellschaft, Germany

[21] Appl. No.: 317,667

[22] Filed: Oct. 5, 1994

[30] Foreign Application Priority Data

Dec. 17, 1993 [DE] Germany .................. 43 43 270.0

[51] Int. Cl.$^6$ ............................................. B29C 47/36
[52] U.S. Cl. ............... 425/192 S; 425/197; 425/198; 425/199; 425/382.2
[58] Field of Search ................. 425/192 S, 198, 425/382.2, 199, 197; 210/448, 452, 247

[56] References Cited

U.S. PATENT DOCUMENTS

| | | | |
|---|---|---|---|
| 2,437,685 | 3/1948 | Dreyfus | 425/197 |
| 3,074,104 | 1/1963 | Stanley | 425/197 |
| 3,570,059 | 3/1971 | Mott | 425/192 S |
| 3,728,061 | 4/1973 | Mott | 425/198 |
| 3,750,889 | 8/1973 | Acosta | 210/499 |
| 3,802,821 | 4/1974 | Mott | 425/192 S |
| 3,841,489 | 10/1974 | Combest et al. | 210/448 |
| 3,985,654 | 10/1976 | Pall | 425/198 |
| 4,283,289 | 8/1981 | Meyst et al. | 210/448 |
| 4,704,077 | 11/1987 | Lenk | 425/192 S |
| 5,304,052 | 4/1994 | Schroeder et al. | 425/198 |

FOREIGN PATENT DOCUMENTS

| | | | |
|---|---|---|---|
| 841485 | 6/1952 | Germany | 425/197 |
| 145547 | 12/1980 | Germany | 425/197 |
| 4225341 | 2/1993 | Germany | 425/197 |
| 52-24059 | 6/1977 | Japan | 425/197 |
| 60-96429 | 5/1985 | Japan | 425/197 |

OTHER PUBLICATIONS

Nicos H. Andreas "Filtration of High Polymer:Filter Media and Filter Geometry Selection Criteria" International Fiber Journal, Jun. 1991, pp. 25,26,28,30–32, 50–56.

*Primary Examiner*—Jan H. Silbaugh
*Assistant Examiner*—Vi Duong Dang
*Attorney, Agent, or Firm*—Banner & Allegretti, Ltd.

[57] ABSTRACT

Spinning head for spinning polymer melts, having a filter cartridge made of a seamless metal cloth cylinder having an end cap and a connector, said cartridge being disposed within a melt passage having a conical taper toward the bottom. The connector is inserted into the melt channel and has a matching conical shape to seal against the channel wall. A die plate having a maximum area of 90 cm$^2$ connects to the connector. An opening through the connector permits filtered polymer melt to flow from the filter cartridge through the connector to the die plate. A single filter cartridge is provided for each die plate, whereby the ratio of filter area to die plate area is at least 0.5:1.

12 Claims, 3 Drawing Sheets

SPINNING HEAD WITH FILTER CARTRIDGE

This invention concerns a spinning head for spinning polymer melts, the geometry and dimensions of which provide for uniform melt flow and highly efficient filtering of the polymer melt.

THE PRIOR ART

In melt spinning, the polymer melt must be subjected to superfine filtration by means of a sand filter, a metal fiber filter package or filter cartridges before passing through the die plate. It is known that the polymer melt can be passed through a plurality of parallel filter cartridges consisting of sintered metal powder or several layers of metal cloth, where the filter cartridges are inserted or screwed into connecting bores of a filter plate or a solid distributor element by means of a cylindrical connecting piece (U.S. Pat. Nos. 3,570,059, 3,802,821 and 4,704,077).

A disadvantage of this design is that a uniform flow through all the filter cartridges is practically impossible, so individual filter cartridges become preferentially clogged and all the filter cartridges must be cleaned or replaced after a short lifetime. In the case of form-sintered filter cartridges, the connecting piece inside the candle must be lengthened by a guide pin, because otherwise it is impossible to establish a connection between the porous body and the connecting piece that can withstand the melt pressure. On the incoming flow side, this leads to a dead-space zone where the melt stagnates at the level of the guide pin and despite a great accuracy in dimensions, polymer melt becomes lodged between the connecting piece and the connecting bore. If some parts of the melt have a longer dwell time, this leads to unwanted thermal degradation of the polymer, in some cases so severe that insoluble, discolored ("cracked") products are formed—not to mention the fact that form-sintered filter cartridges are very expensive.

Filter cartridges made of metal cloth are much less expensive and therefore are widely used. The metal cloth which is flat at first is rolled up and then welded with a longitudinal seam to form a cylinder that is welded with circumferential welds to the end cap and to the connecting piece with an internal guide flange. These filter cartridges are usually not completely round. Because of these manufacturing tolerances and the bead-like welds, additional assembly gaps exist within the nozzle blocks where there is little or no flow of the polymer melt and the connecting bores must be equipped with additional gaskets. This results in increased production of degraded polymer and, therefore, more frequent down times for cleaning. Furthermore, the welds are difficult to clean and do not have good resistance to polymer pressure.

SUMMARY OF THE INVENTION

The object of the present invention is to provide a spinning head having an improved filter cartridge in which these disadvantages are minimized or do not occur at all. In particular, a uniform flow of polymer melt without any dead spots is the goal.

This object is achieved according to this invention by providing a spinning head corresponding to the specifications set forth below.

Unlike conventional cartridges in which a flat metal cloth is welded to form a cylinder, the novel filter cartridge according to this invention consists of one piece of a seamless tube of metal cloth welded to a cap or cover on one end and to a frusto-conical connector on the other end by means of electron beam welding. Electron beam welding equipment is commercially available from industrial distributors such as Prazisionstechnik GmbH of Maintal, Germany.

The central melt channel in the spinning head surrounding the filter cartridge is tapered or frusto-conical at least in the lower third thereof. The frusto-conical connector on the lower end of the filter cartridge has the same conical pitch or taper as the central melt channel, and is forced by the flow of the polymer melt into the complementary tapered melt channel in a self-sealing manner. A single filter cartridge is provided for each die plate. To assure a sufficient ratio of filter area to die plate area of at least 0.5:1 with a reasonable filter length, the die plate area must be limited to a maximum of 90 cm$^2$, preferably a maximum of 60 cm$^2$. Therefore, larger die plates are outside the scope of the present invention. This assures an extremely uniform flow of the polymer melt. With a maximum filter length of 15 cm, especially 4 to 10 cm, which is preferred for assembly reasons, the ratio of filter area to die plate area is preferably in the range of 0.5:1 to 2:1, especially 1:1.

The longitudinal weld of conventional filter cartridges is eliminated and the circumferential welds are less bulging due to the electron beam welding. Therefore, no assembly gap and/or additional seal is needed in conjunction with the conical design of the melt channel.

BRIEF DESCRIPTION OF THE DRAWING

This invention is explained in greater detail below in connection with the accompanying drawing in which.

DETAILED DESCRIPTION OF THE INVENTION

Figure 1:
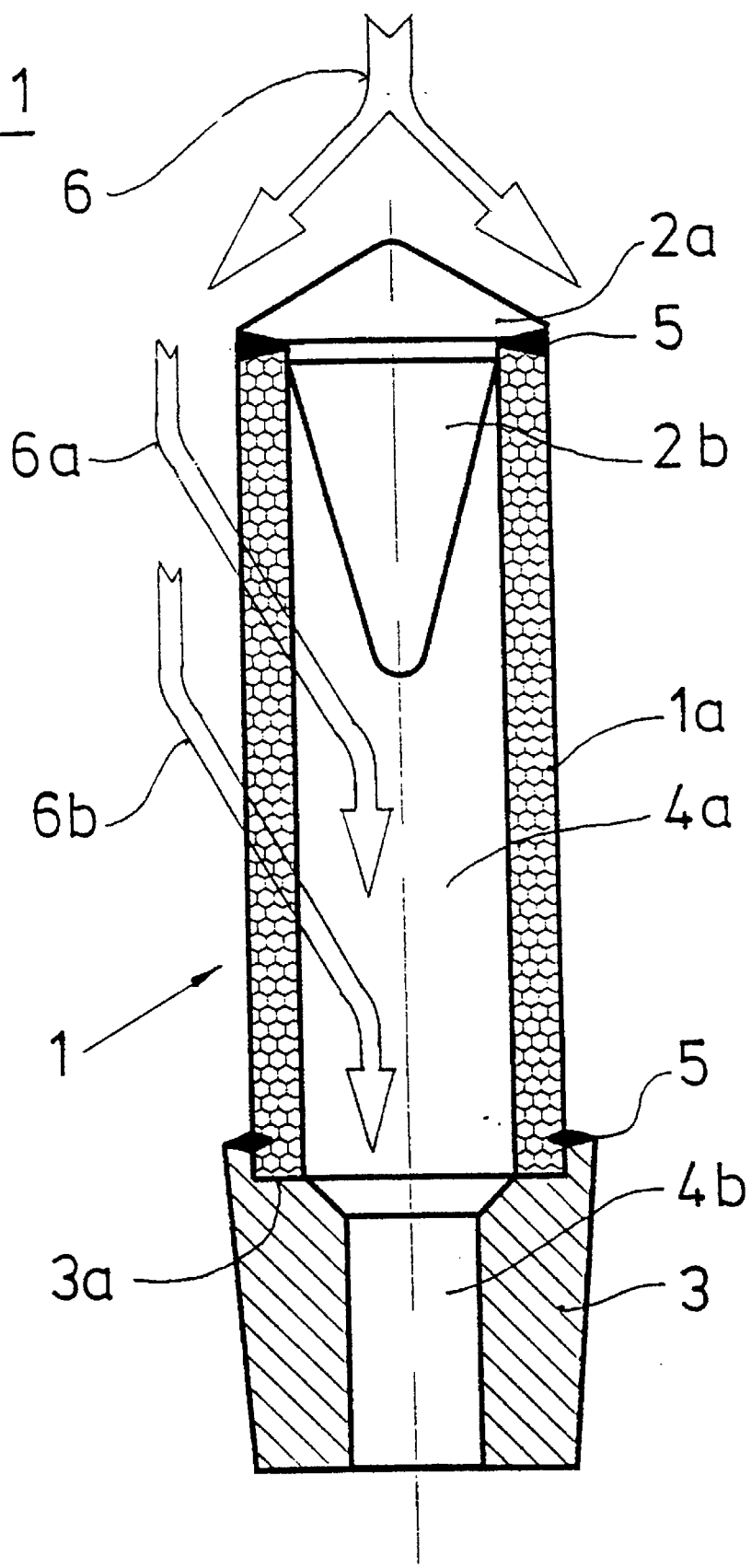
FIG. 1 is a longitudinal sectional view through a filter cartridge according to this invention, arrows indicating the direction of polymer melt flow.

The filter cartridge 1 according to this invention as shown in FIG. 1 comprises a one piece commercial seamless cylindrical metal cloth tube 1a, having several seamless layers of fabric sintered together. The outside diameter is usually between 8 and 20 mm, preferably 12 to 16 mm, the length, which is determined by the built-in dimensions of the spinning head, is preferably 4 to 15 cm and the filter mesh is 5 to 20 μm. The cylinder will withstand a maximum pressure difference of 350 bar. The cartridge 1 also includes a cover 2a, flow guide cone 2b and connector 3.

The upper end of the cylinder 1a is welded to a melt-impermeable cover 2a integrally-formed with a flow guide cone 2b by electron beam weld 5. The side of the cover 2a facing the polymer melt flow 6 is in the shape of a cone, preferably rounded at the tip, or a spherical cup, in order to guide the flow better. The inverted cone 2b projecting into the cylinder of the filter cartridge has a rounded tip pointing down, to prevent the development of turbulence in the melt in the upper area of the filter zone and equalizing the flows 6a and 6b.

The lower end of cylinder 1a is welded by an electron beam weld 5 to a frusto-conical connector 3 that tapers toward the lower end and has a cylindrical central opening 4b. The taper of the external wall of connector 3 corresponds to a cone in the range of 1:20 to 1:50, preferably 1:50 (according to DIN standard no. 7178, part 1). The ratio designates a change of one unit in diameter for each 20 or 50 units of length. The upper diameter is larger than that of the cylinder 1a only by the amount necessary for welding and includes a seat 3a for the end of filter cylinder 1a. The length of the connector 3 is determined on the basis of the required strength and is approximately equal to the upper diameter. The central opening or melt channel 4b may have the same diameter as the inside diameter of the cylinder 1a or it may taper toward the bottom or preferably, as shown in FIG. 1, it may have a slightly smaller cylindrical diameter with a conical transition. The slight compression of the melt caused by this tapering improves the uniformity of the distribution of the melt over the entire die plate.

Figure 2:
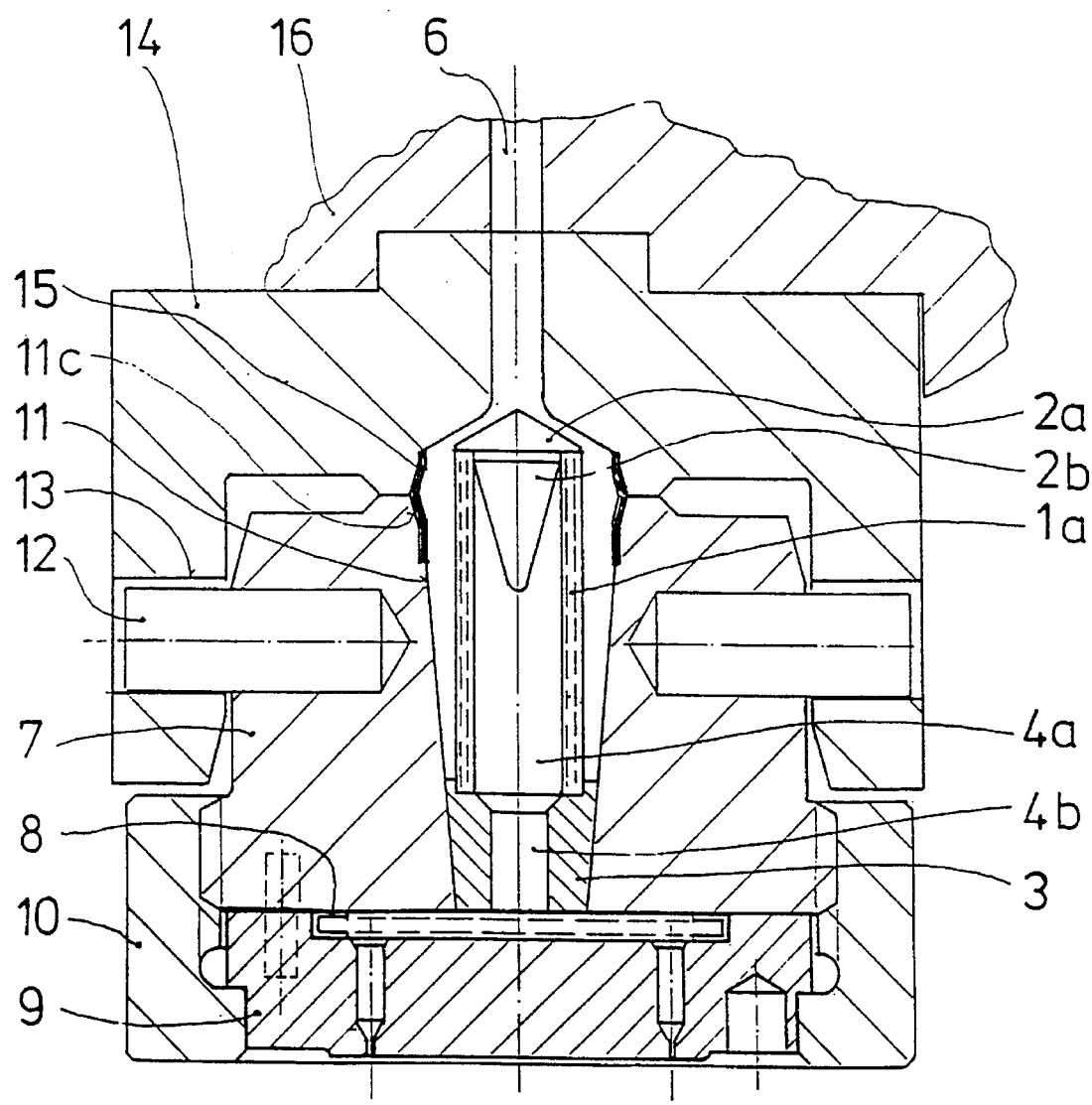
FIG. 2 is a longitudinal sectional view through a spinning head with a filter cartridge inserted into a frusto-conical melt channel.

FIG. 2 shows the installation of the filter cartridge 1 in a spinning head having a round die plate 9 and a bayonet-type closure according to German patent application P 4 239 560.7 (corresponds to U.S. Pat. No. 5,304,052) for securing the body to the cap of the spinning head. The threaded ring 10 screws on to the die block casing 7 and supports the die plate 9 and a self-sealing filter 8. The die plate 9 is secured against twisting by a pin in the usual way. At least two bolts 12 projecting radially from the casing 7 engage cooperating cam slots 13 in the depending flange of the spinning head cap 14. The spinning head cap 14 is screwed tightly to the spinning beam 16 in such a manner that it can be locked to the die block casing 7 including the filter cartridge 1, filter 8 and die plate 9. The bayonet closure is locked and released by turning the bottom part (die block casing 7 and ring 10) of the spinning head about the spinning axis. Due to the inclined cam shaped grooves 13, the die block casing 7 is drawn tightly against the cap 14 in closing and is locked in this position. Simultaneously, the tube gasket or bushing seal 15 is pressed mechanically against the accommodation boring 11c at the interface between cap 14 and die block casing 7 to form a pressure-tight seal around the central melt passage.

The central melt channel 6 in beam 16 and in cap 14 expands into a funnel shape in the lower portion of the cap in order to accommodate the conical cover 2a of the filter cartridge 1. Below the funnel, the melt channel 11 in the die block casing 7 has a frusto-conical wall tapering from the seat of the bushing seal 15 over the entire length of the die block casing 7 down to the die plate. The tapered channel 11 has the same pitch or conical shape as that of the connector 3 and serves as a seat for the connector. Due to the pressure exerted by the polymer melt flowing into the melt channel 6, especially on the cover 2a of the filter cartridge, the connector 3 of the filter cartridge is pressed into the lower end of the tapered channel 11 in a self-sealing manner. Since the filter zone within the tapered passage 11 offers a lower resistance to the melt flow than the interface between the connector 3, and the wall of channel 11, the complementary contacting surfaces of which have high dimensional accuracy, this interface remains practically free of polymer deposits.

The polymer melt is distributed uniformly from the cover 2a symmetrically over the ring gap between the wall of the conical passage 11 and the filter cartridge 1. The melt flows from polymer melt inlet 6, radially through the filter cartridge from the outside to the inside 4a, and axially through connector 3 to the die plate. The melt flow is equalized further by the flow guide cone 2b. There are no dead spots in the ring gap or inside the filter cartridge. The compression caused by the narrowing of the melt channel 4b contributes toward a more uniform distribution of the melt over the entire cross section of the filter 8 and the die plate 9.

Figure 3:
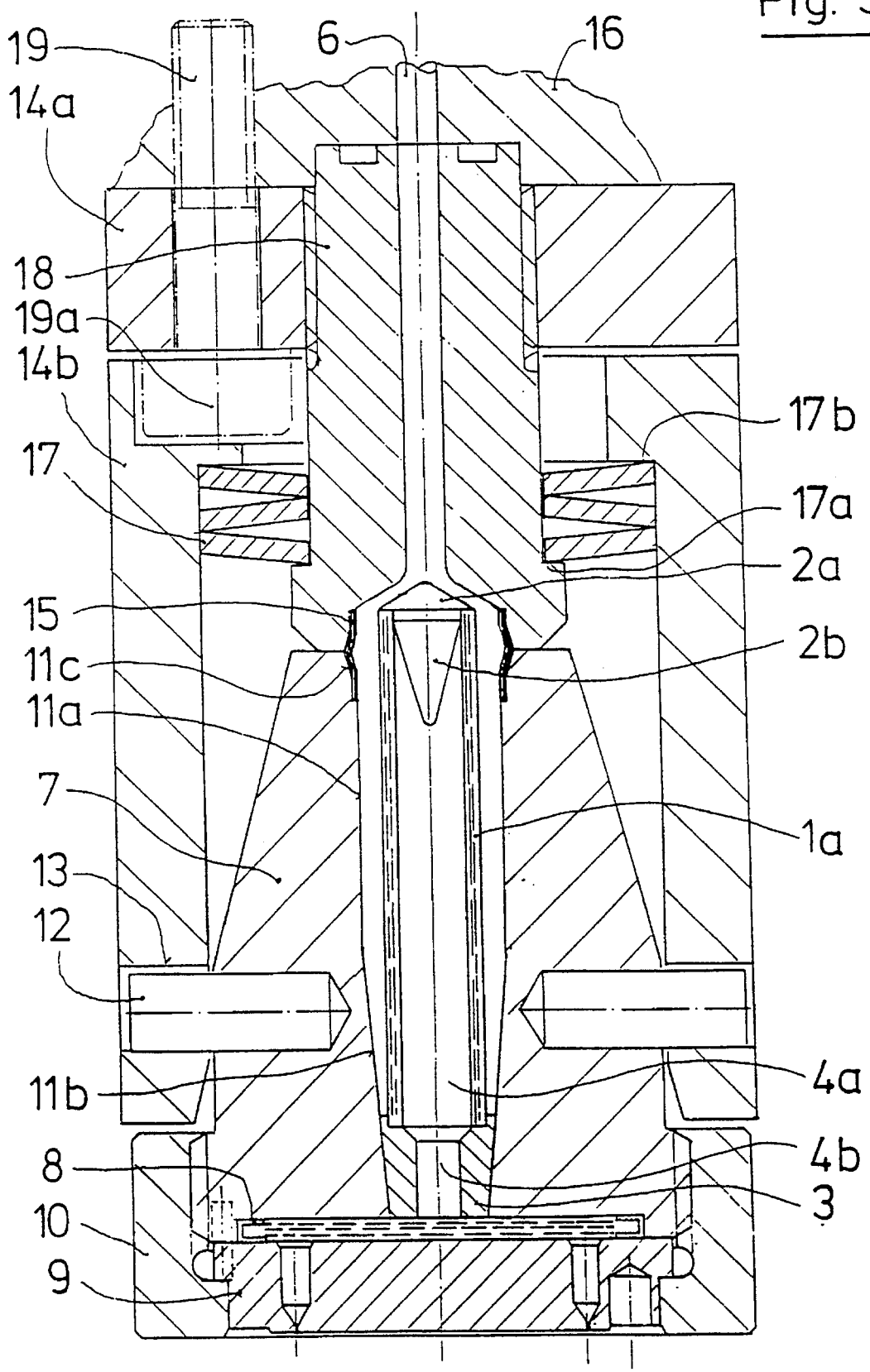
FIG. 3 is a longitudinal sectional view through a modified spinning head with a filter cartridge inserted into a melt channel that is partially frusto-conical and partially cylindrical.

The spinning head illustrated in FIG. 3 differs from that in FIG. 2 essentially in the construction of the spring-mounted top part of the spinning head and the shape of the melt channel that holds the filter cartridge.

The top part of the spinning head here consists of the plate 14a that is mounted by bolts 19 on the spinning beam 16, the pin 18 that is screwed into the plate 14a and the coupling ring 14b that is supported by the spring 17 on the pin 18 compressed between shoulders 17a and 17b on the pin and ring, respectively. The coupling ring 14b is secured by the head 19a of bolt 19 to prevent it from twisting when the die plate casing 7 is turned on to the ring 14b.

The filter cartridge shown in FIG. 3 is especially long. The passage 11a, 11b holding the filter cartridge 1 is therefore designed with a frusto-conical shape only in the lower area 11b that corresponds to at least one third of the total installed height. The upper area 11a is cylindrical. This avoids having an impermissible enlargement of the ring gap between the wall 11a and the filter cartridge 1 in the upper area. Otherwise, the design, function and numbering correspond to those in FIG. 2.

The filter cartridge according to this invention can also be used with spinning heads of a different design, especially those with a screw closure. Round die plates are preferred. Oval or rectangular die plates whose longitudinal dimensions do not greatly exceed the transverse dimensions can be used. However, the area of the die plate must not exceed 90 cm², preferably 60 cm², because otherwise the filter area of the single filter cartridge according to this invention would not be sufficient. If the spinning head comprises more than one die plate, then a single filter cartridge within a single tapered passage is provided for each die plate.

In summary, a spinning head with the filter cartridge used according to this invention permits a very uniform melt flow with a uniform symmetrical oncoming flow against the filter area and without any dead zones. The maximum allowed pressure difference is about 100 bar higher than with traditional filter cartridges. Assembly and cleaning are simple. The costs are not higher than with known filter systems, but instead tend to be lower.

We claim:

1. A spinning head for spinning polymer melts comprising
   a cap,
   a die block casing secured to said cap,
   wall means defining a central melt passage extending through said casing and having a tapered end,
   a die plate mounted on said casing adjacent said tapered end,
   said plate having an area not exceeding 90 cm²,
   a filter cartridge disposed within said central melt passage and extending between said die plate and said cap,
   said cartridge comprising a seamless metal cloth cylinder radially spaced from said central melt passage to define a space surrounding said cartridge and having one covered end adjacent said cap,
   a tapered connector at the other end of said cartridge in self-sealing engagement with the wall means at said tapered end, said connector having a central opening connecting said central melt passage with said die plate, and means defining a polymer melt inlet in said cap connecting to said central melt passage whereby polymer melt flows over said cover, axially into the space surrounding said cartridge, radially through said metal cloth cylinder and axially through said connector to said die plate.

2. The spinning head of claim 1 in which the ratio of the filter area of said cylinder to the area of the die plate is at least 0.5:1.

3. The spinning head of claim 2 in which said cylinder has a maximum filter length of 15 cm and the ratio of its filter area to the area of the die plate is in the range of 0.5:1 to 2:1.

4. The spinning head of claim 1 in which said tapered connector is frusto-conical and corresponds to a conical ratio of change of diameter to length in the range of 1:20 to 1:50.

5. The spinning head of claim 1 in which said tapered connector is frusto-conical and corresponds to a conical ratio of change of diameter to length of 1:50.

6. The spinning head of claim 2 in which said cylinder has a filter mesh of 5 to 20 μm and will withstand a pressure differential of 350 bar.

7. The spinning head of claim 1 in which the wall means of said central melt passage between said tapered end and said cap is cylindrical.

8. The spinning head of claim 1 in which the wall means of said central melt passage between said tapered end and said cap is also tapered to provide a frusto-conical wall around said cylinder over its entire length.

9. The spinning head according to claim 1 in which said die block easing is round and has radially-extending pins which engage cooperating cam slots in said cap and in which said cap and said die block casing have annular abutting faces surrounding said central melt passage, a joint between said annular abutting faces being sealed by a bushing.

10. The spinning head of claim 1 in which said filter cartridge includes an inverted cone within said cylinder adjacent said cylinder cover.

11. The spinning head of claim 1 in which said die plate has a maximum area of 60 $cm^2$.

12. The spinning head of claim 1 in which said seamless metal cloth cylinder is secured to said cover and to said tapered connector by a weld.

* * * * *